Figure 4:
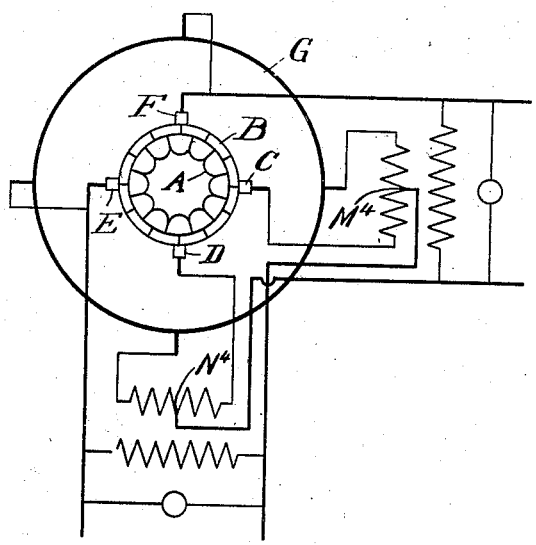

No. 838,144. PATENTED DEC. 11, 1906.
W. STANLEY.
DYNAMO ELECTRIC MACHINE.
APPLICATION FILED MAY 22, 1905.
2 SHEETS—SHEET 1.
Fig. 1.
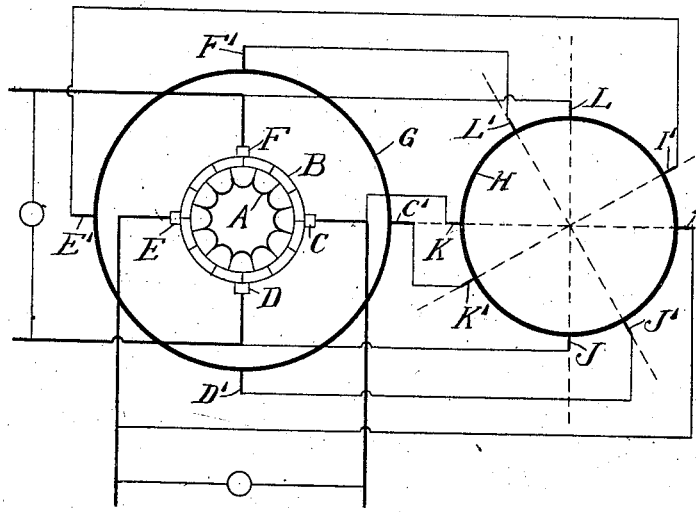
Fig. 1a.
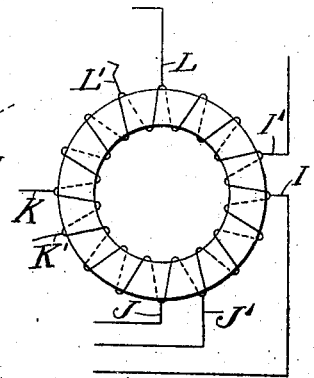
Fig. 1b.
Fig. 2.
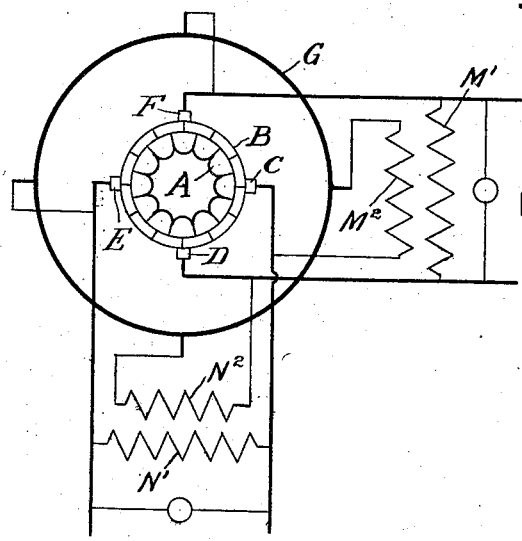
Fig. 3.
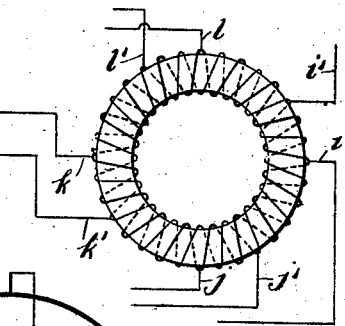
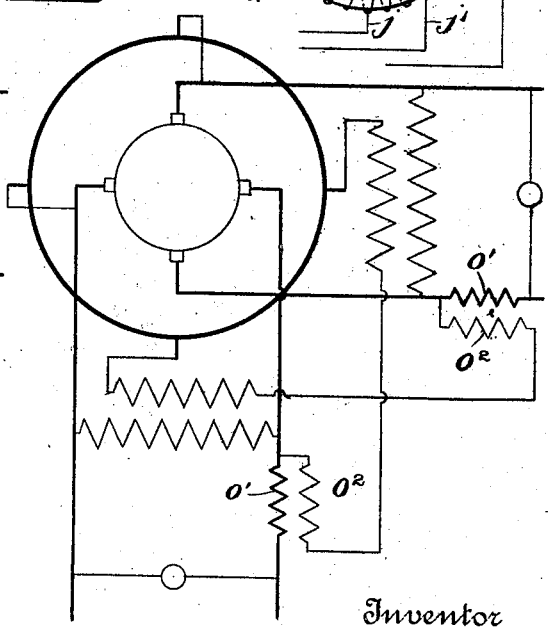
Witnesses
Chas. W. Beach
L. Vreeland
Inventor
WILLIAM STANLEY
By his Attorneys
Bartlett, Brownell & Mitchell No. 838,144.  
PATENTED DEC. 11, 1906.

W. STANLEY.
DYNAMO ELECTRIC MACHINE.
APPLICATION FILED MAY 22, 1905.

2 SHEETS—SHEET 2.

Witnesses  
Inventor  
WILLIAM STANLEY  
By his Attorneys

UNITED STATES PATENT OFFICE.

WILLIAM STANLEY, OF GREAT BARRINGTON, MASSACHUSETTS.

DYNAMO-ELECTRIC MACHINE.

No. 838,144.　　　Specification of Letters Patent.　　　Patented Dec. 11, 1906.

Application filed May 22, 1905. Serial No. 261,503.

*To all whom it may concern:*

Be it known that I, WILLIAM STANLEY, a citizen of the United States, residing at Great Barrington, Berkshire county, Massachusetts, have invented certain new and useful Improvements in Dynamo-Electric Machines, of which the following is a full, clear, and exact description.

My invention relates to dynamo-electric machines, and has for its object to provide a self-exciting dynamo-electric machine in which the field-producing windings are energized by alternating currents supplied from the machine itself.

In applications already filed by me I have explained how in certain machines of the self-exciting rotary field type it is necessary that the phase of the electromotive force induced on the stator-windings shall not coincide with the phase of the electromotive force induced on the rotor-windings, and I have described various means for accomplishing this result. Such means consist in placing windings symmetrical in construction in dissymmetrical position or in placing windings dissymmetrical in construction in symmetrical positions. I have now discovered means whereby the necessary displacement of the electromotive forces may be obtained by windings which are symmetrical in construction and also symmetrical in position, the difference of phase of the rotor and stator electromotive forces being brought about by the introduction of phase-differing electromotive forces upon the magnetizing-circuits of the machine. This arrangement is particularly useful in cases where it is in certain cases desired to dispense with the commutator or to have the windings of a large number of turns of relatively high resistance. Thus in cases where dissymmetry of position is relied upon to produce the dissymmetrical field such a high-resistance winding would necessitate such a displacement of the rotor and stator windings as would lessen their mutual induction and interfere with the inherent regulation of the machine, which is dependent largely upon low resistance and high mutual induction between the two circuits. My present invention makes it unnecessary to have any displacement of the windings, and therefore preserves the mutual induction between the circuits, and thus accomplishes the required end.

The following is a description of apparatus embodying my invention, reference being had to the accompanying drawings, in which—

Figure 1 represents diagrammatically one arrangement embodying my invention. Fig. 1ª represents in detail the winding of the transformer embodied therein. Fig. 1ᵇ represents a modification of the transformer. Fig. 2 represents another embodiment of my invention. Fig. 3 represents a third embodiment in which compounding action also is provided for. Fig. 4 represents another arrangement.

Referring more particularly to the drawings, A represents a rotor-winding. B is the commutator, to which this winding is connected. C, D, E, and F are brushes bearing upon said commutator.

G is the stator-winding.

H is the winding of an exciting-transformer, in the present instance represented as a rotary field-transformer and shown more fully in Fig. 1ª, from which taps I, J, K, and L are taken, these taps being connected, respectively, to the rotor-brushes C, D, E, and F. Other taps I' J' K' L' are also taken from this transformer-winding and are connected at points C' D' E' F' upon the stator-winding directly opposite to the points C, D, E, and F upon the rotor-winding. The taps I J K L and I' J' K' L' are displaced by an angle substantially equal to ninety degrees less the lag of the magnetizing-current of the stator. In this way two electromotive forces are obtained, one upon the rotor-terminals and one upon the stator-terminals, differing in phase from one another and competent to urge a magnetizing-current through the rotor and stator windings, and thus to magnetize the machine. A similar result can be obtained with the exciting-transformer shown in Fig. 1ᵇ, which has two windings constituting distinct primary and secondary, as distinguished from the single winding of Fig. 1ª. When the terminals *i j k l* of this transformer are connected to the rotor-brushes and the terminals *i' j' k' l'* are connected to the stator-taps, the angle of displacement of the transformer-terminals in this case will also be substantially equal to ninety degrees less the lag of the magnetizing-currents.

Instead of using a rotating field-transformer other types of exciting-transformers may be used and may be arranged in various ways so long as the transformers induce electromotive forces upon the energizing-circuits of the machine in quadrature to the electromotive forces induced by the rotation of its rotor, and therefore competent to urge a current over the resistance of the magnetizing-circuit. Such an arrangement is shown in Fig. 2, in which, as in Fig. 1, A is the winding of the rotor. B is the commutator, C D E F the brushes bearing thereon, and G the stator-winding. M' is the primary winding of an exciting-transformer connected across the mains of one phase, whose secondary $M^2$ is connected to the brush C of the other phase and to a stator-tap in line therewith. N' is the primary of a second exciting-transformer connected across the mains of the other phase and having its secondary $N^2$ connected at one end to the brush D of the first phase and at the other end connected to the stator-tap in line therewith. These transformers are so wound that the induced electromotive forces of the transformer secondary windings are substantially in quadrature to the induced electromotive forces of the rotor and stator windings. When connected as shown, these transformers have induced in their secondary windings electromotive forces which are competent to urge currents over the resistances of the magnetizing-circuits, and thus excite the machine.

In order that the machine above described may also compound, I may provide compounding primaries for the magnetizing-transformers or compounding-transformers whose primaries O' O' are in series with the work-circuits, respectively, and whose secondaries $O^2$ $O^2$ are in series, respectively, with the secondaries of the exciting-transformers. This arrangement results in causing the energizing-currents to vary with the load upon the work-circuits, so that the machine may be made to have any desired potential gradient. The particular work-circuit with which a particular compounding-transformer should be in series depends upon whether the machine is to be compounded for a lagging load or a unity power-factor load. The arrangement shown in Fig. 3 is the proper one when the load is of unity power factor. In this case, since the working currents lag 0° behind their electromotive forces, the electromotive forces introduced into the energizing-circuits by the compounding-transformers will increase with increase of load and will therefore cause an increase of magnetizing-current. The compounding-transformer, if connected so as to introduce an opposing electromotive force into the energizing-circuit, will obviously produce a regulation resulting in a negative potential gradient, while if the two electromotive forces work together the regulation will result in a positive potential gradient.

The arrangement of Fig. 4 shows one of each pair of mains connected to the center of a transformer secondary. Thus in Fig. 4 one of the vertical mains is connected to the center of the secondary winding $M^4$ instead of being connected directly to the brush C, as in Fig. 2, while one of the other pair of mains is connected to the center of the secondary $N^4$ instead of being connected directly to the brush D, as in Fig. 3. The connections of Fig. 4, with the above exception, are the same as those of Fig. 2. The arrangement of Fig. 4 is particularly advantageous where the conditions are such that both stator and rotor windings are supplying substantially equal amounts of energy to the mains, since the self-induction of the secondaries is thus neutralized for all load-currents—that is to say, the self-induction of the secondaries is neutralized for load-currents flowing from both rotor and stator circuits, since the magnetizing forces set up by the load-currents in the two halves of the secondaries are equal and opposite, and thus neutralize one another. This arrangement tends to maintain the mutual induction between the rotor and stator circuits, because it eliminates a self-induction in the circuits.

Without desiring to limit myself to the particular arrangements and connections above described or to the precise form of transformers above referred to, since obviously changes will occur to those skilled in the art, what I claim is—

1. In a dynamo-electric machine, the combination of rotor and stator windings connected together, and means external to said windings for inducing upon the circuits thus formed alternating electromotive forces competent to urge alternating magnetizing-currents through them.

2. In a dynamo-electric machine, the combination of multiphase rotor and stator windings connected together, and exciting-transformers having their secondaries in the connection between said windings.

3. In a dynamo-electric machine, the combination of rotor and stator windings connected together and to work-circuits, and exciting-transformers having their secondaries in the connection between said windings.

4. In a dynamo-electric machine, the combination of multiphase rotor and stator windings connected together, multiphase mains leading from such connections, and exciting-transformers having their primaries in parallel with the mains of one phase and their secondaries in series connection with said windings.

5. In a dynamo-electric machine, the combination of rotor and stator windings, a connection between said windings and to a work-circuit, and means for inducing an electromotive force in such connection competent to urge an alternating magnetizing-current through said windings in quadrature to the electromotive forces induced upon them.

6. In a dynamo-electric machine, the combination of rotor and stator windings, a connection between said windings, and means for inducing alternating electromotive forces in such connection competent to urge alternating magnetizing-currents in the same relative direction through said windings.

7. In a dynamo-electric machine, the combination of rotor and stator windings connected together, with transformers for inducing alternating magnetizing-currents within such windings whereby a rotating magnetic field is produced, which with rotation induces opposing electromotive forces of the same phase and similar frequency upon said connected windings.

8. In a dynamo-electric machine, the combination of rotor and stator windings connected together and to a work-circuit, with exciting-transformers so connected to said windings as to induce multiphase magnetizing-currents in them whereby a rotating magnetic field is produced, and means for delivering energy-currents from both of said windings to the external circuits.

9. In a dynamo-electric machine, the combination of multiphase rotor-windings and multiphase stator-windings, multiphase mains leading from said windings, connections between both of said windings, and a primary having windings in said connections and connected to said mains.

10. In a dynamo-electric machine, the combination of rotor-windings and stator-windings, a commutator connected to said rotor-windings, brushes connected to said commutator and connected to said stator-windings, and exciting-transformers having their secondaries in the connection between said brushes, the brushes to which the primaries are connected being angularly displaced relatively to the brushes to which the secondaries are connected, and said stator-windings and their primaries connected to said brushes.

11. In a dynamo-electric machine, the combination of rotor and stator windings connected together, means for inducing upon the circuit thus formed electromotive forces competent to urge magnetizing-currents through them, and means for varying the value of such electromotive forces in proportion to the variation of the load of the machine.

12. In a dynamo-electric machine, the combination of rotor-windings and stator-windings, a commutator connected to said rotor-windings, brushes bearing upon said commutator, connections between said brushes and said stator-windings, secondary windings of exciting-transformers in said connections and compounding-transformers having their primaries in series with the work-circuits and their secondaries in series with said secondary windings.

13. In a dynamo-electric machine, the combination of rotor-windings and stator-windings, a commutator connected to said rotor-windings, brushes bearing upon said commutator, connections between said brushes and points on said stator-windings directly opposite said brushes, and means inserted in said connections for producing electromotive forces competent to urge magnetizing-currents over said stator-windings.

14. In a dynamo-electric machine, the combination of rotor-windings and stator-windings, a commutator connected to said rotor-windings, brushes bearing upon said commutator, connections between said brushes and points on said stator-windings substantially opposite said brushes, transformers in said connections producing secondary electromotive forces competent to urge magnetizing-currents over said stator-windings, and compounding-transformers having their secondaries also in said connections and their primaries in series with the work-circuits.

15. In a dynamo-electric machine, the combination of rotor-windings and stator-windings, a commutator connected to said rotor-windings, a plurality of brushes bearing upon said commutator, and exciting-transformers each having its primary connected to one pair of brushes and its secondary connected to said stator-windings at points such as to set up a magnetic field acting dynamically upon the circuit connecting a pair of brushes other than that to which it is connected.

WILLIAM STANLEY.

Witnesses:
E. FACCIOLY,
JOSEPH C. FREIN.